(12) United States Patent
Yamamoto

(10) Patent No.: US 9,747,523 B2
(45) Date of Patent: Aug. 29, 2017

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Shinji Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/887,052

(22) Filed: Oct. 19, 2015

(65) Prior Publication Data
US 2016/0117840 A1    Apr. 28, 2016

(30) Foreign Application Priority Data

Oct. 22, 2014    (JP) .................................. 2014-215788

(51) Int. Cl.
  G06K 9/00      (2006.01)
  G06K 9/62      (2006.01)
  G06T 7/215     (2017.01)

(52) U.S. Cl.
  CPC ....... *G06K 9/6212* (2013.01); *G06K 9/00342* (2013.01); *G06T 7/215* (2017.01); *G06T 2207/30196* (2013.01)

(58) Field of Classification Search
  None
  See application file for complete search history.

(56) References Cited

U.S. PATENT DOCUMENTS

| | | | | |
|---|---|---|---|---|
| 2003/0128298 A1* | 7/2003 | Moon | ................... | G06T 7/2033 348/578 |
| 2006/0126738 A1* | 6/2006 | Boice | .................... | G01S 3/7862 375/240.16 |
| 2009/0175496 A1* | 7/2009 | Kondo | ..................... | G06K 9/32 382/103 |
| 2009/0295926 A1* | 12/2009 | Miyazaki | ........... | H04N 5/23219 348/169 |
| 2010/0046798 A1* | 2/2010 | Miyazaki | ................ | G06T 7/204 382/103 |
| 2011/0102570 A1* | 5/2011 | Wilf | ........................ | G06F 3/017 348/77 |
| 2012/0020524 A1* | 1/2012 | Ishikawa | ................ | H04N 7/183 382/103 |
| 2012/0134541 A1* | 5/2012 | Hara | .................. | G06K 9/00295 382/103 |
| 2012/0242838 A1* | 9/2012 | Kodama | ................. | G06T 7/248 348/169 |

(Continued)

FOREIGN PATENT DOCUMENTS

JP    2013-25490 A    2/2013

*Primary Examiner* — Shervin Nakhjavan
(74) *Attorney, Agent, or Firm* — Canon USA, Inc. IP Division

(57)    ABSTRACT

An information processing apparatus includes a tracking unit configured to identify a tracking region including a tracking object in an image, an identification unit configured to identify a motion region inside the tracking region in the image, a derivation unit configured to derive a ratio of the motion region relative to the tracking region, and a determination unit configured to determine whether to continue tracking the tracking object based on the derived ratio.

19 Claims, 11 Drawing Sheets

(56) References Cited

U.S. PATENT DOCUMENTS

| | | | |
|---|---|---|---|
| 2012/0243738 A1* | 9/2012 | Sakata | H04N 5/23219 382/103 |
| 2013/0176430 A1* | 7/2013 | Zhu | G06T 7/2053 348/143 |
| 2014/0086450 A1* | 3/2014 | Huang | G06K 9/00261 382/103 |
| 2016/0343221 A1* | 11/2016 | Mori | G08B 13/19608 |

* cited by examiner

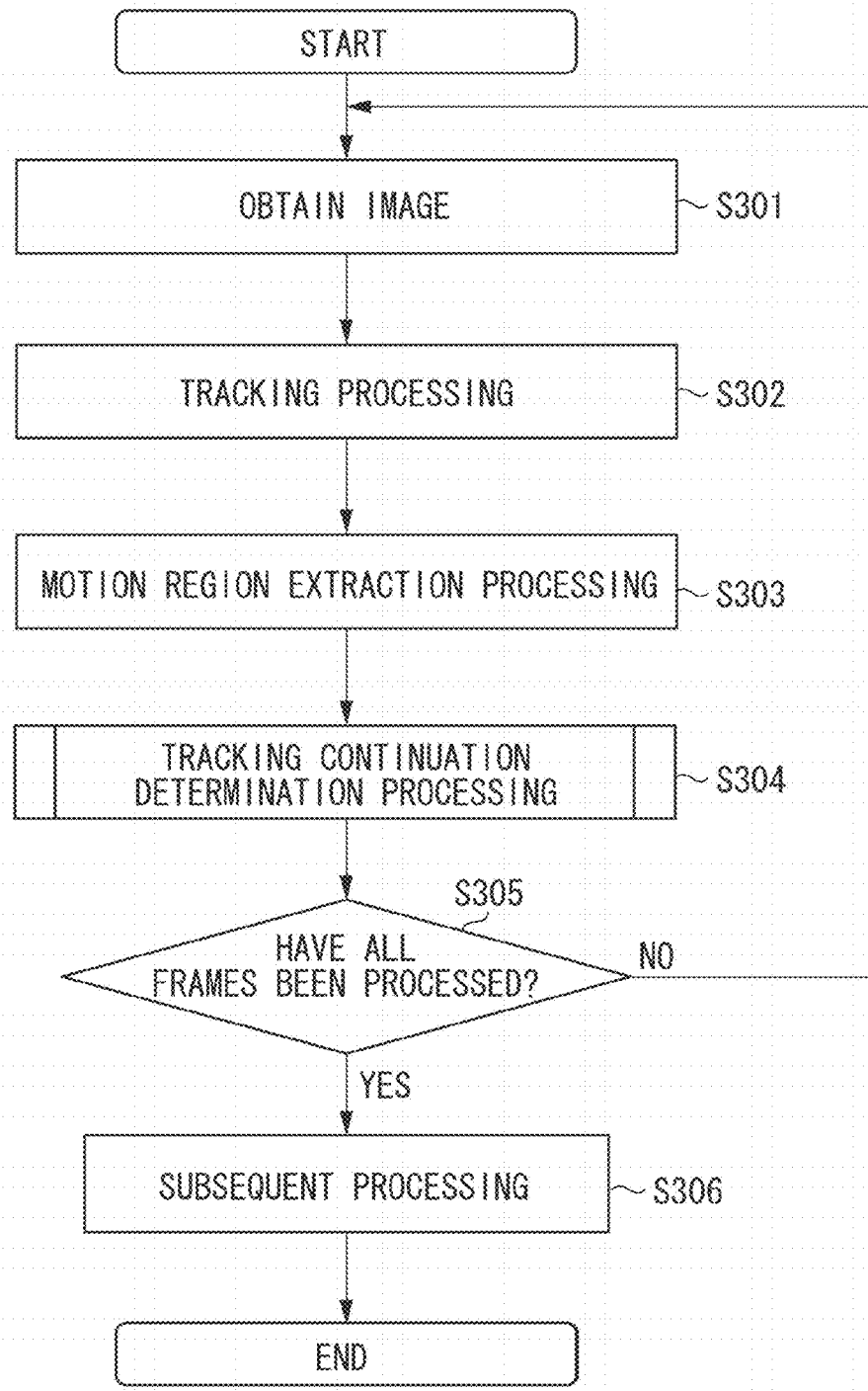

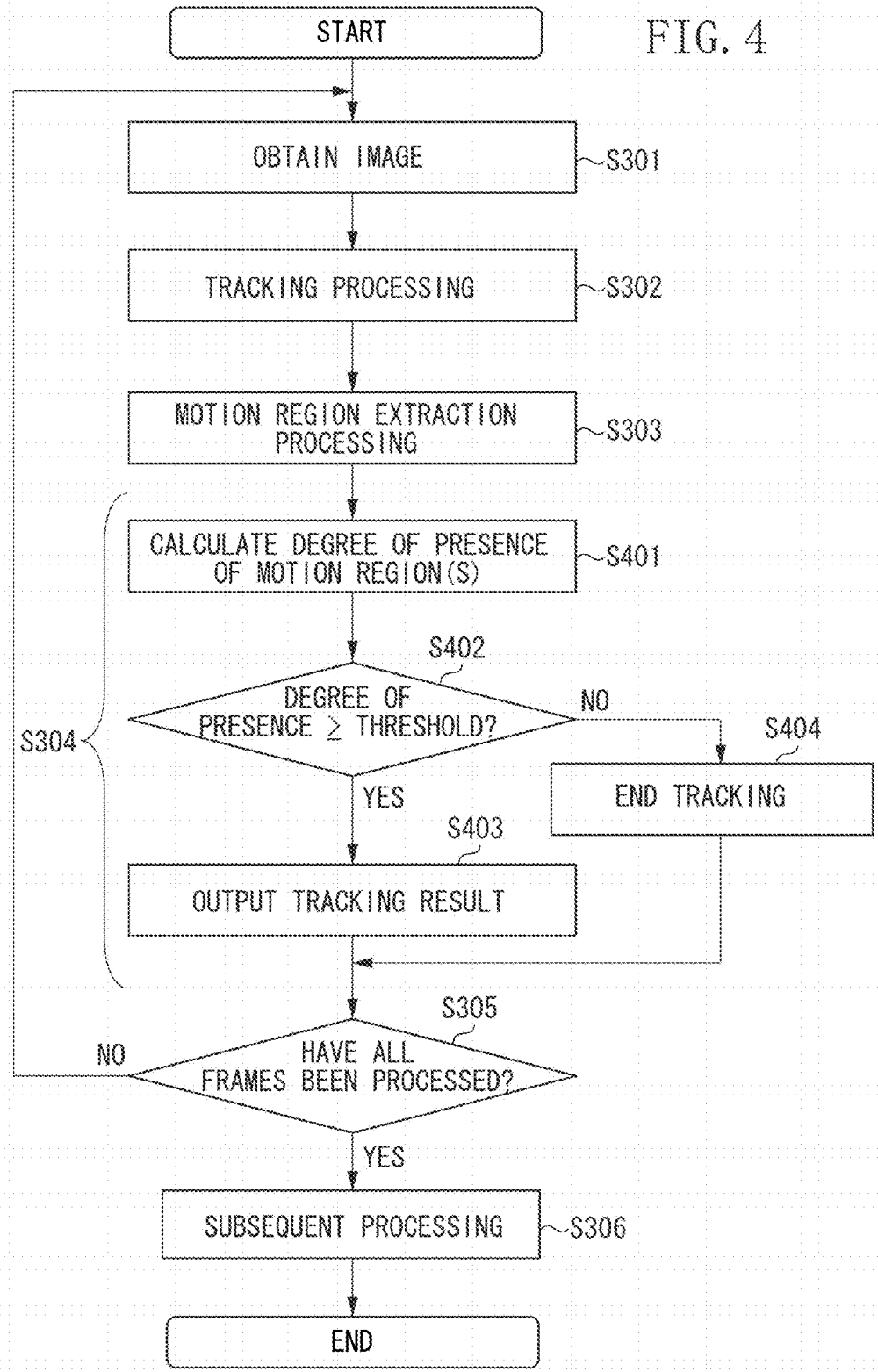

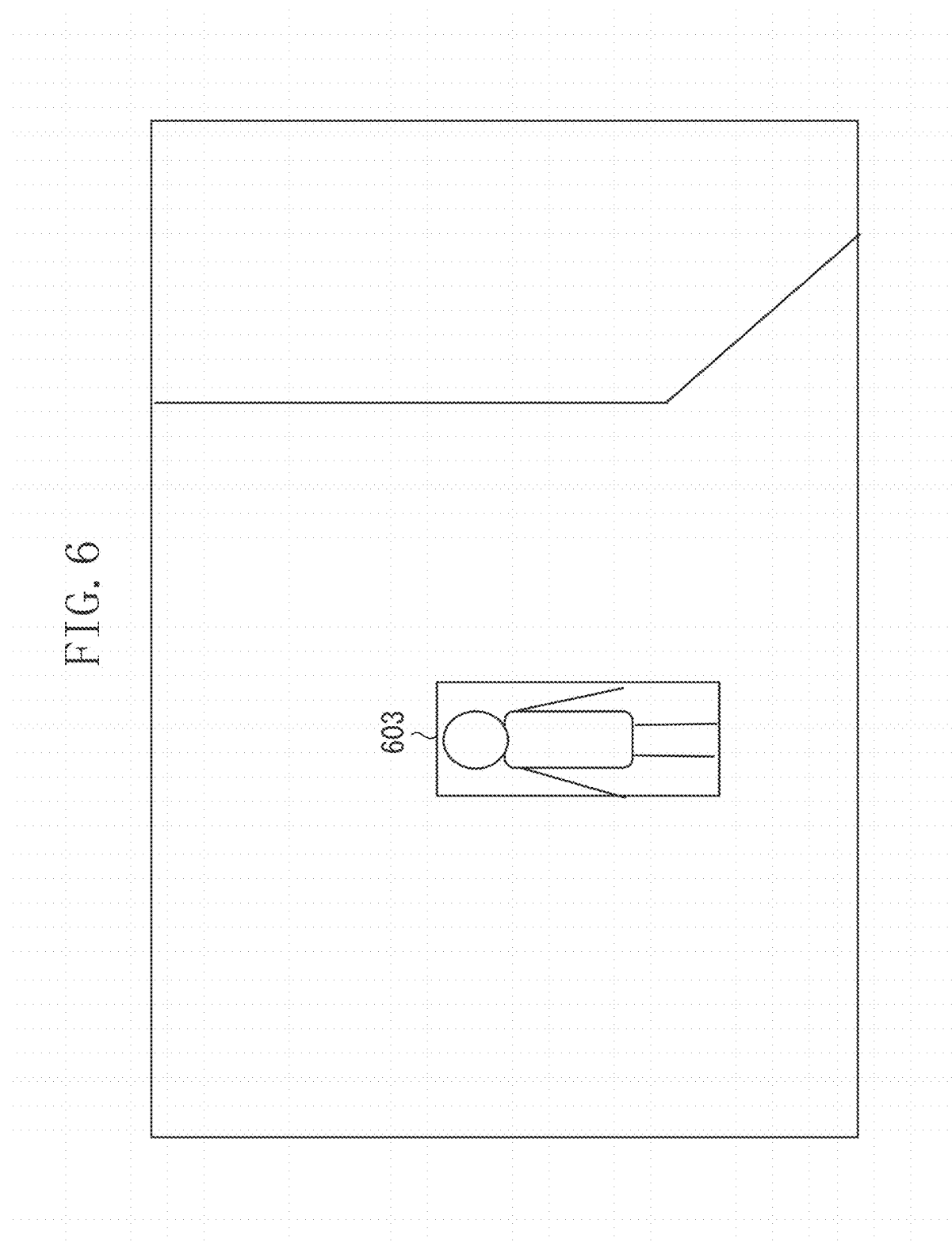

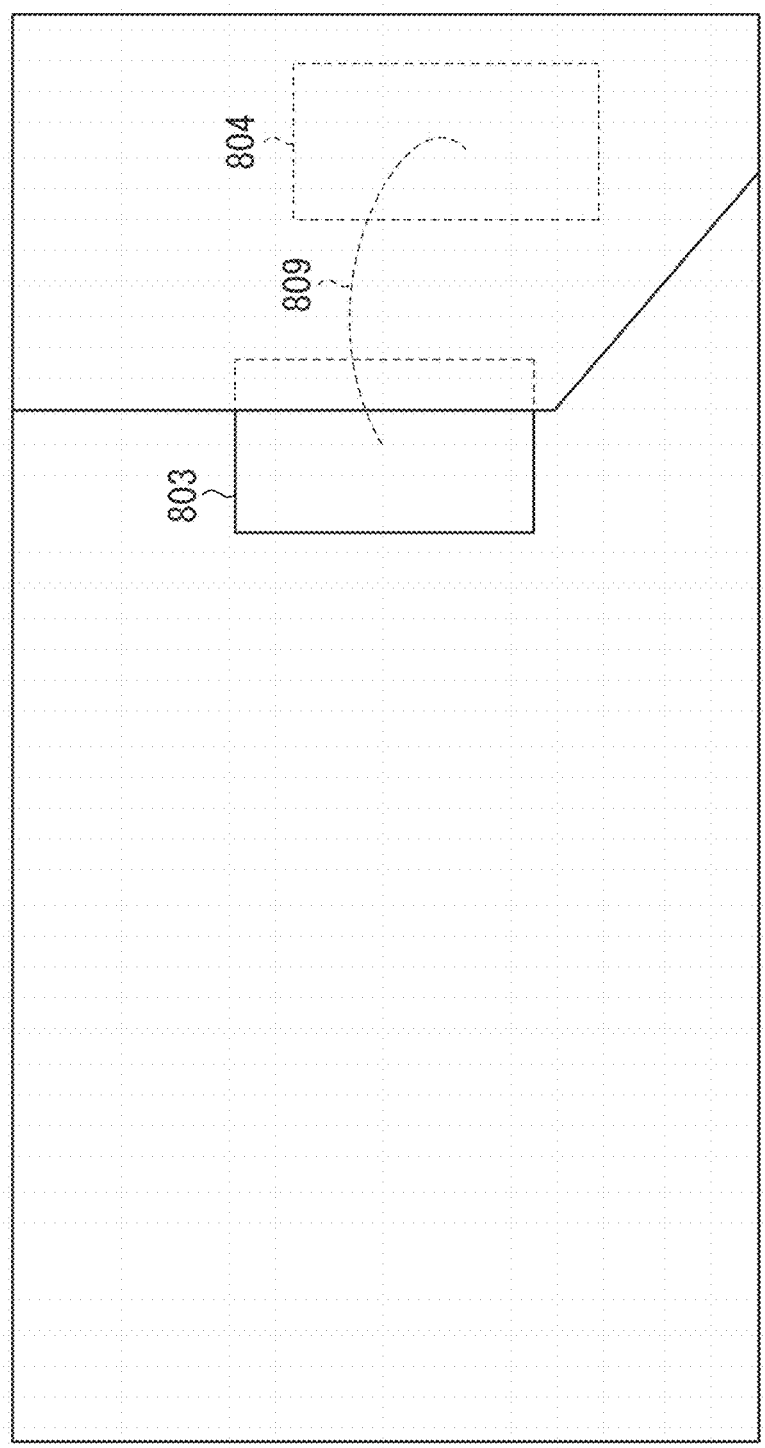

INFORMATION PROCESSING APPARATUS, INFORMATION PROCESSING METHOD, AND RECORDING MEDIUM

BACKGROUND

Field of the Disclosure

The present disclosure relates to an information processing technique for tracking an object in an image.

Description of the Related Art

Methods and apparatuses for tracking an object in continuous images or a moving image (hereinafter, such images will be referred to simply as an "image") by using the image. There is a tracking method using image features among the conventional methods. According to the tracking method, a position of an object to be tracked is identified by performing movement prediction of the object and matching processing for comparing features of the object with visual features of an input image.

Such a tracking method is not able to continue subsequent tracking processing and ends tracking if the object to be tracked goes out of an image frame. If the object to be tracked hides behind a wall or goes out a door, the object within the image frame can become unable to be imaged, in which case the object disappears from the captured image. In such a case of disappearance within the image frame, the reliability of matching of image features typically drops. If the reliability falls to or below a certain value, the tracking is ended.

Concerning such a tracking end determination, Japanese Patent Application Laid-Open No. 2013-25490 discusses a tracking method for associating tracking information about an object and a detection result of the object between image frames, the tracking method including determining whether to continue, suspend, or end tracking. According to such a method, a degree of correspondence is calculated when associating the detection result of the object and the tracking information. A continuation determination of tracking is made possible by using the value of the degree of correspondence. More specifically, various determinations and processes are performed depending on the value of the degree of correspondence. Possible determination processes include ones for (1) continuing tracking the tracking object, (2) once suspending tracking because the tracking object is temporarily hidden, and (3) ending the tracking processing because the tracking information and the detected object do not sufficiently correspond to each other.

According to the typical technique for determining an end of tracking by using the reliability of matching, the reliability may fail to fall quickly if the target object disappears. Since the reliability does not fall, the tracking can continue to cause a phenomenon called "drift" in which the tracking object continues to be searched for in a position where there is no object.

FIGS. 10A to 10D illustrate such a situation. FIGS. 10A to 10D illustrate transitions when the time elapses in order of FIGS. 10A, 10B, 10C, and 10D. FIG. 10A illustrates a tracking object 1001, such as a person, and a tracking region 1003 around the tracking object 1001. The tracking region 1003 is a rectangular region including the person serving as the tracking object 1001. As the time elapses from FIGS. 10A to 10B and to 10C, the tracking object 1001 partly hides behind an obstacle 1002. In FIG. 10D, the entire tracking object 1001 hides behind the obstacle 1002. Suppose that the obstacle 1002 and the tracking object 1001 do not have a large difference in terms of image features. In such a case, as described above, the reliability of matching does not fall quickly and the tracking continues. In FIG. 10D, the tracking region 1003 still remains. Such a phenomenon is called "drift." Examples of the case where there is no large difference in image features include when the tracking object 1001 is a person dressed in white and the obstacle 1002 is a white wall. Because of the disappearance of the tracking object 1001 from the image frame, the tracking is supposed to be suspended or ended. However, the occurrence of the foregoing drift delays the determination to suspend or end the tracking processing. In FIG. 10D, since the tracking object 1001 is not captured in the image, the position of the tracking object 1001 is not shown in the tracking region 1003, whereas the tracking region 1003 is located in a position where features are closest to those of the tracking object 1001.

The method discussed in the foregoing Japanese Patent Application Laid-Open No. 2013-25490 associates the tracking region of an object and the detection result of the object between frames. The tracking accuracy therefore depends on the detection result of the object. Possible methods for object detection include a method for detecting a moving object from a difference between a captured image of the background and an image of the frame of interest, and a method for learning an image of the object to be detected to generate an identifier and performing detection by using the identifier. According to the method using a difference from the background image, the detected object, in some frames, may be segmented due to discontinuous pixels. The detected object may be connected with another moving object to increase in size. In such cases, the degree of correspondence between the tracking information so far and object detection information can drop significantly.

FIGS. 11A to 11D illustrate such a situation. FIGS. 11A to 11D illustrate transitions when the time elapses in order of FIGS. 11A, 11B, 11C, and 11D. FIG. 11A illustrates a tracking object 1101, such as a person, and a tracking region 1103 (in FIG. 11A, rectangular region) around the tracking object 1101. In FIG. 11B, hatched rectangles represent pieces of difference information 1104 relative to the background. According to the technique using a difference from the background, the difference information 1104 serving as portions to be detected does not necessarily exactly coincide with the tracking object 1101 but may overlap only in part. As illustrated in FIG. 11B, the pieces of difference information 1104 may be detected as a plurality of separate objects. Such a phenomenon can occur, for example, if the person to be tracked assimilates to the background. This results in insufficient correspondence between the detected plurality of objects and the tracking object 1101. As a result, the tracking processing can be suspended or ended by mistake even if there still is the tracking object 1101 in the image frame of FIG. 11B. In another example, in FIG. 11C, the tracking object 1101 is almost entirely hidden behind an obstacle 1102. The difference information 1104 is still detected because part of the tracking object 1101 is included in the image frame. In FIG. 11D, the entire tracking object 1101 hides behind the obstacle 1102, and no difference information 1104 is detected. In such an example, the tracking object is supposed to be suspended or stopped at FIG. 11D where the difference information 1104 is not detected, whereas the tracking processing can be stopped at the timing of FIG. 11B. In other words, the tracking processing can be suspended or ended too early.

For the foregoing reasons, according to the conventional techniques, a determination to suspend or end the tracking processing can be delayed by the occurrence of a drift if the tracking object in the image disappears. Moreover, an erroneous determination to suspend or end the tracking processing can be made because of poor correspondence between the tracking object and the past tracking information. This has resulted in low accuracy of the determination to continue the tracking processing.

SUMMARY

The present disclosure is directed to providing an information processing technique that reduces a delay or an error of the determination to suspend or end the tracking processing and enables a more accurate determination to continue the tracking processing.

According to an aspect of the present invention, an information processing apparatus includes a tracking unit configured to identify a tracking region including a tracking object in an image, an identification unit configured to identify a motion region inside the tracking region in the image, a derivation unit configured to derive a ratio of the motion region relative to the tracking region, and a determination unit configured to determine whether to continue tracking the tracking object based on the derived ratio.

Further features of the present invention will become apparent from the following description of exemplary embodiments with reference to the attached drawings.

BRIEF DESCRIPTION OF THE DRAWINGS

FIG. 3 is a flowchart for describing a procedure of processing performed by an information processing apparatus according to the first exemplary embodiment.

FIG. 4 is a flowchart for describing details of the procedure of the processing performed by the information processing apparatus according to the first exemplary embodiment.

FIG. 6 is an explanatory diagram illustrating processing for determining whether to continue tracking a stationary object.

FIG. 8 is an explanatory diagram illustrating an example when a display is changed.

DESCRIPTION OF THE EMBODIMENTS

Exemplary embodiments of the present invention will be described in detail below with reference to the accompanying drawings. It should be noted that the following exemplary embodiments are just a few examples of means of implementation of the present invention. Modifications and changes may be made as appropriate according to configurations and various conditions of apparatuses to which the present invention is applied. The present invention is not limited to the following exemplary embodiments.

A video processing apparatus according to a first exemplary embodiment is applicable to an image processing circuit built in an imaging apparatus such as a surveillance camera, and a computer apparatus such as a personal computer.

Figure 1:
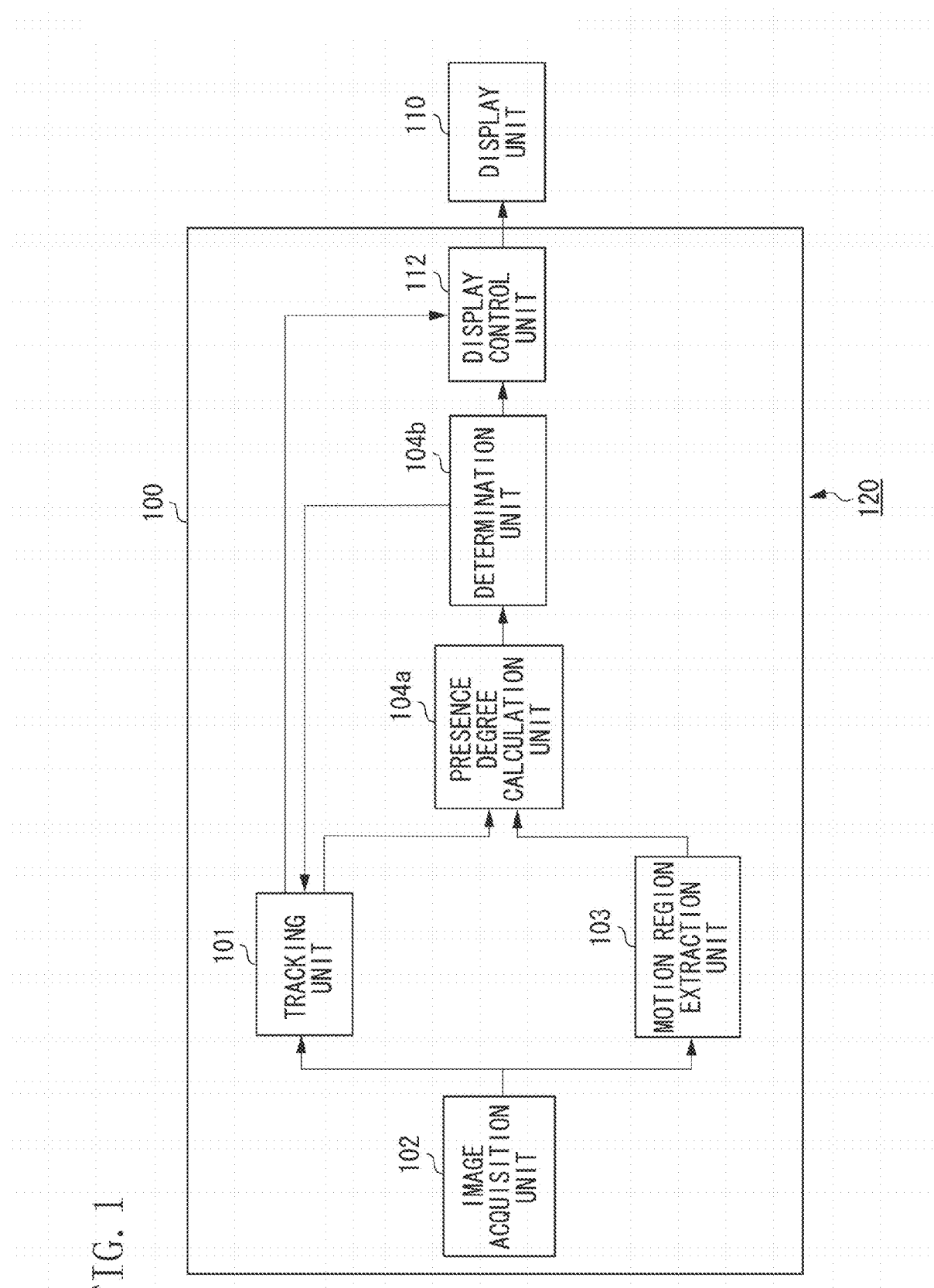
FIG. 1 is a block diagram illustrating a functional configuration example of a video processing apparatus according to a first exemplary embodiment.

A functional configuration example of the video processing apparatus according to the present first exemplary embodiment will initially be described with reference to the block diagram of FIG. 1. In FIG. 1, a video processing apparatus 120 includes an information processing apparatus 100 and a display unit 110.

The information processing apparatus 100 is typically a camera unit that can capture continuous images or a moving image (hereinafter, simply referred to as "image"). The camera unit can include various information processing circuits having functions to be described below. In other words, the information processing apparatus 100 is a camera unit including all or part of object tracking functions. The information processing apparatus 100 may include an ordinary personal computer (PC) and a camera (such as a web camera) connected thereto as long as the functions of the video processing apparatus 120 according to the present first exemplary embodiment can be implemented. The information processing apparatus 100 may be a camera including the functions of the present first exemplary embodiment.

The display unit 110 includes a display device for displaying an image captured by the camera unit. The display unit 110 can simultaneously display an image and tracking information. Typically, a small-sized PC may be used as a display terminal. The information processing apparatus 100 and the display unit 110 may be included in the same casing of the same apparatus. Alternatively, the information processing apparatus 100 and the display unit 110 may be configured as separate apparatuses locally or remotely connected with each other.

(1) Configuration of Information Processing Apparatus 100

An image acquisition unit 102 (see FIG. 1) of the information processing apparatus 100 is a camera itself that captures an image. The image acquisition unit 102 includes a predetermined optical system, a charge-coupled device (CCD) or complementary metal oxide semiconductor (CMOS) image sensor, and various circuits for controlling the optical system and the image sensor. If the information processing apparatus 100 is constituted by a PC as described above, the image acquisition unit 102 may be a web camera or a Universal Serial Bus (USB) camera connected to the PC. As mentioned above, the information processing apparatus 100 may be included in a camera.

(Image Acquisition Unit 102)

The image acquisition unit 102 successively obtains images captured by the image sensor. In other words, the image acquisition unit 102 can obtain images of respective frames constituting a moving image in succession. One or more tracking objects may come in and out of frames of the moving image. A tracking object or objects may move inside the moving image over a plurality of frames. The image acquisition unit 102 successively transmits the obtained images of the frames to a tracking unit 101 and a motion region extraction unit 103.

In the present first exemplary embodiment, an example where the image acquisition unit 102 captures images by itself is described. However, this is not restrictive. For example, the image acquisition unit 102 may obtain images from an external imaging apparatus that can capture images. In such a case, the image acquisition unit 102 serves as an interface with the imaging apparatus. The image acquisition unit 102 may obtain images from an external storage device in which the images are stored (recorded) in advance. In such a case, the image acquisition unit 102 serves an interface with the storage device. The acquisition location (source) of the images is thus not limited to a particular one.

(Tracking Unit 101)

The tracking unit 101 receives the images output from the image acquisition unit 102. The tracking unit 101 tracks a tracking region including a tracking object in the received images of the respective image frames by using a technique such as matching processing using image features.

Such tracking processing includes identifying a position of an object determined to be tracked (i.e., tracking object) and associating tracking objects as the same object between image frames. For example, a region specified by the user is initially set to be a tracking region including a tracking object. The tracking unit 101 then extracts, for example, a color histogram or texture as an image feature amount from image data inside the set tracking region, and sets the resultant as a template of the tracking object. More specifically, the tracking unit 101 sets a size (height and width) and the image feature amount of the set tracking region as the template of the tracking object. The tracking unit 101 performs matching processing between the feature amount set as the template and an image frame subsequently input, and identifies a position where a degree of similarity is highest in the image as a new position of the tracking object. The tracking unit 101 then identifies a position of the tracking region including the tracking object in an image frame. The tracking unit 101 generates information including an object identifier related to the tracking and the position and size of the tracking region including the tracking object, as tracking information, and outputs the tracking information to a presence degree calculation unit 104*a* and a display control unit 112 at subsequent stages.

Note that the tracking unit 101 generates the tracking region as part of the tracking information.

The tracking information will be described in detail. The tracking information includes various types of information related to tracking, including the tracking region (for example, a bounding box to be described below) and a tracking position (coordinate values). The tracking information includes the size of the tracking region such as a width and height, a feature amount of the tracking object (sometimes referred to as object) such as a color histogram, and an identifier (ID) of the tracking object. Depending on the intended use, only part of the information may be used. Other related information may be included. In particular, in the present first exemplary embodiment, a technique for using the tracking region among the pieces of tracking information is mainly described. Other tracking information may be used.

The template-based matching processing is commonly considered to be less likely to cause a drift than histogram-based matching. However, since a drift can occur depending on the background pattern and the shapes of surrounding images, there can be plenty of room to apply various tracking determination techniques proposed in the present exemplary embodiment. Here, an initial value of the position of a tracking object is the position of the region specified by the user. A moving object detected in this region is to be tracked. A feature of the specified region is regarded as being that of the moving object, and stored as a template. A new position of the region constituting the moving object (consequently, tracking region) in each image frame (hereinafter, also referred to simply as "frame") is successively found by matching processing. The new position of the tracking region serves as a new position of the tracking object.

If a plurality of positions is identified to be present in a frame by matching, the one closer to the position of the tracking region in the previous frame is identified to be the new position (new tracking region). In simple terms, such processing is successively performed on the frames to track the position of the tracking object. Such a tracking method is just an example. The tracking method is not limited to a particular one, and various tracking techniques may be applied.

The tracking processing may be automatically set to start by using processing for recognizing a tracking object. The foregoing feature amounts (also referred to as image feature amounts) used for matching may be histogram of oriented gradient (HOG) feature amounts or Haar feature (or Haar-like feature) amounts which are commonly used in object detection. Other feature amounts may be used.

A feature amount at the start of tracking may be used until the end. The feature amount may be updated in each frame or only at frames where a specified condition is satisfied. Feature amounts about tracking objects may be learned online. Processing for detecting a tracking object may be performed, and detected positions, size information, and feature amounts may be used to associate the detection results between a plurality of frames to identify the position of the tracking object and use the identified position as tracking information. When associating the detection results between a plurality of frames, the tracking object may fail to be detected. The tracking processing may include performing a search using the feature amounts and interpolating the position of the undetected tracking object only in such a case.

A Kalman filter may be used to predict movement. A particle filter may be used to determine an object position in a comprehensive manner.

As described above, the tracking object is expressed by the tracking region initially set by the user, and successively moves in position in each frame. The tracking region substantially represents the extracted tracking object. The position of the tracking object mentioned above also refers to that of the tracking region. In particular, if the tracking region is rectangular, the tracking region may be called a bounding box. The tracking region is a kind of information included in the tracking information.

(Motion Region Extraction Unit 103)

The motion region extraction unit 103 extracts regions including motion from each frame of the moving image received from the image acquisition unit 102. In such extraction processing, for example, the motion region extraction unit 103 extracts motion regions by determining a difference between a reference image generated in advance and the image of the current frame. After the extraction of the motion regions in the image, the motion region extraction unit 103 generates a motion determination result (label map) corresponding to each pixel of each frame related to the extraction as information about the motion regions, and outputs the motion determination result to the presence degree calculation unit 104*a* at the subsequent stage.

While the motion region extraction unit 103 is described to extract the motion regions in the image frame, the motion region extraction unit 103 may, for example, read motion regions that are extracted in advance and stored in a storage device, and identify a motion region or regions to process, such as one included in the tracking region.

In the present first exemplary embodiment, the motion region extraction unit 103 extracts all motion regions in the frame image. The presence degree calculation unit 104a at the subsequent stage then identifies a motion region or regions in the tracking region by using the information about the tracking region output from the tracking unit 101. Instead, the motion region extraction unit 103 may extract only the motion region(s) in the foregoing tracking region. In such a case, the motion region extraction unit 103 may receive the information about the tracking region from the tracking unit 101. Such an extraction method is just an example of the method for extracting motion regions. The method for extracting motion regions is not limited to a particular one, and various extraction methods may be employed.

A captured image of a motionless scene may be prepared in advance and used as the foregoing reference image. A reference image may be dynamically generated by using information about a plurality of frames.

Instead of simply determining a difference from the reference image, the image may be divided into small regions for statistical determination. Optical flow or feature point matching may be used to make a determination based on motion vectors. The information to be generated (information about the motion regions) may include rectangles including the regions and identifiers indicating the rectangles. A motion determination result may be generated for each of the small regions into which the image is divided, and such motion determination results may be used as the information about the motion regions.

(Presence Degree Calculation Unit 104a and Determination Unit 104b)

The presence degree calculation unit 104a calculates the degree of presence (ratio) of the motion region(s). A determination unit 104b performs tracking continuation determination processing (hereinafter, may be referred to simply as determination processing) based on the calculated degree of presence.

In the present first exemplary embodiment, the presence degree calculation unit 104a calculates the degree of presence of the motion region(s) included in the tracking region. The determination unit 104b makes a determination based on the degree of presence.

In the determination processing according to the present first exemplary embodiment, the presence degree calculation unit 104a initially calculates the degree of presence of the motion region(s) included in the tracking region from the tracking region received from the tracking unit 101 and the information about the motion regions received from the motion region extraction unit 103. If the degree of presence is higher than or equal to a predetermined reference value, the determination unit 104b determines to continue tracking. On the other hand, if the degree of presence is lower than the predetermined reference value, the determination unit 104b determines to suspend or end tracking.

An area ratio of the motion region(s) included in the tracking region may be used as the "information about the motion regions" used to calculate the "degree of presence." An amount of movement of the motion region(s) (for example, an amount of movement inside the image frame) may be further used as a coefficient or for weighting.

The information used to calculate the "degree of presence" is not limited to the information about the motion regions. For example, information about the image feature amount (such as color histogram) of the tracking object and amounts of change thereof on a time series may be used as coefficients or for weighting as appropriate. Various other parameters may be used as the degree of presence.

In the present exemplary embodiment, a "stop" of the tracking processing is a concept that covers any processing in which the tracking processing is discontinued. The "suspension" and "end" of the tracking processing according to the present first exemplary embodiment are examples of a "stop."

For example, a tracking object may temporarily hide behind an obstacle in a frame of the moving image and the tracking processing may be temporarily "suspended" (including a case where the tracking processing is resumed after temporarily suspended). A tracking object may go out of a frame of the moving object and the tracking processing may be "ended" (including a case where the obtained related data is discarded without the tracking processing being scheduled to resume). Such situations are covered by a "stop." A case where a tracking object is destructed in a frame and the tracking processing is completely discontinued may also be included. For example, to make a "stop" determination, a plurality of thresholds (reference values) may be provided for the degree of presence. If the degree of presence is lower than a first threshold, the tracking processing may be determined to be "suspended." If the degree of presence is lower than a second threshold that is lower than the first threshold, the tracking processing may be determined to be "ended."

Different types of processing may be performed according to the type of "stop" ("suspension" or "end") (see a third exemplary embodiment to be described below).

Figure 2A:
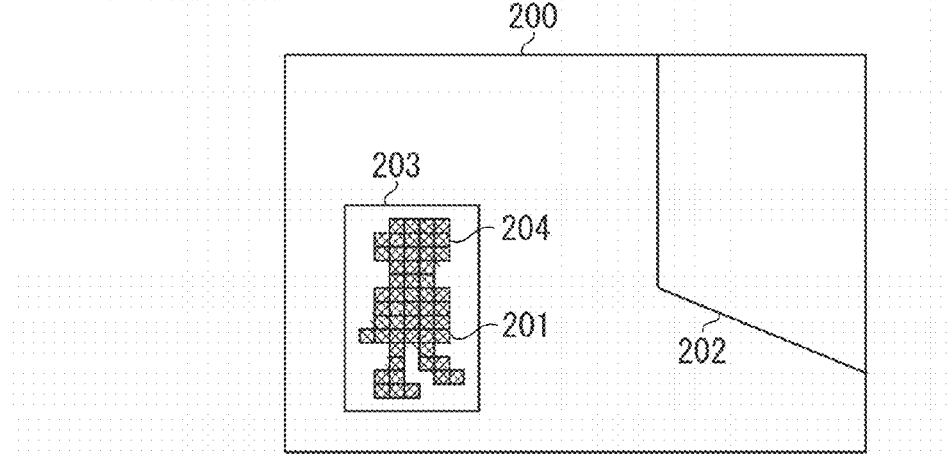
FIGS. 2A, 2B, and 2C are explanatory diagrams illustrating an example of a continuation determination of tracking according to the first exemplary embodiment.
Figure 2B:
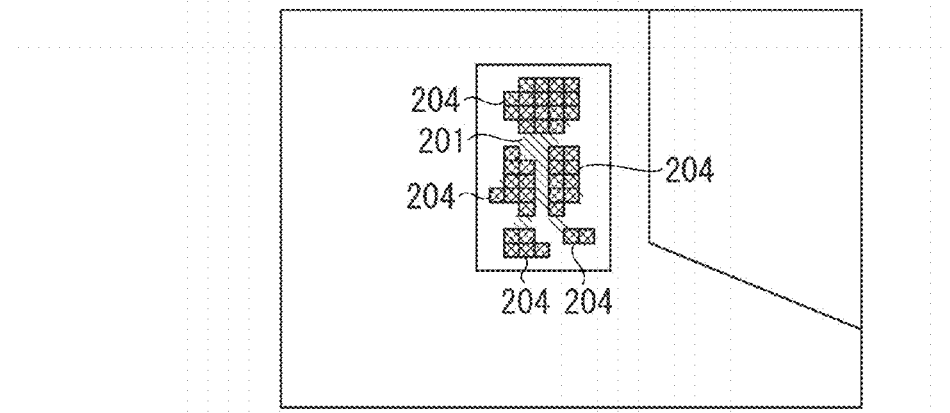
Figure 2C:
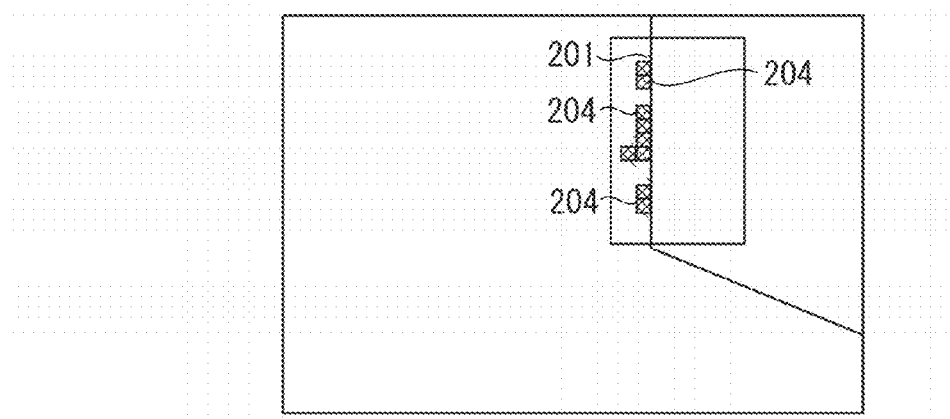

FIGS. 2A to 2C are conceptual diagrams of the determination processing by the determination unit 104b. A scene is considered where there are a tracking object 201 and an obstruction 202 in an image 200. Examples of the tracking object 201 include a human and a humanoid robot. In FIGS. 2A to 2C, the tracking object 201 is illustrated by a lightly-hatched human model. In each of the exemplary embodiments, the obstacle refers to an object that hides the tracking object 1001 such that the tracking object 1001 is not captured in an image captured by the image acquisition unit. For example, the obstacle refers to a wall or furniture.

The tracking unit 101 generates a tracking region 203 about the tracking object 201. The tracking region 203 is part of the information included in the tracking information. In FIGS. 2A to 2C, a rectangular frame indicating the tracking region 203 is displayed.

The motion region extraction unit 103 generates a motion region or regions 204. A motion region 204 is one or a plurality of small regions (group) in which motion is detected. In FIGS. 2A to 2C, each motion region 204 is shown by one or a plurality of densely-hatched rectangular boxes (group). The motion region 204 is part of the information about the motion region 204. The information about the motion region 204 is information including a position, area, shape, an amount of motion, and a direction of motion of the motion region 204.

The presence degree calculation unit 104a calculates (derives) the degree of presence in each tracking region 203 in the image 200 based on the amount of the motion region(s) 204 included in the tracking region 203. For example, in the present exemplary embodiment, the ratio of an area of the motion region(s) 204 relative to that of the tracking region 203 is used as the degree of presence. As described above, the amount of motion of the motion region(s) 204 (for example, the amount of movement inside the image frame) may be used as a coefficient or for weighting. While in the present first exemplary embodiment such a degree of presence is used, various other parameters corresponding to a moving region ratio of the motion region(s) 204 may be used.

In FIG. 2A, the tracking region 203 includes the motion region 204 which is one united region. In the example of FIG. 2A, the area of the tracking region 203 and that of the motion region 204 can be simply compared on a one-to-one basis to calculate the ratio therebetween, which can be used as the degree of presence. In FIG. 2B, the tracking region 203 includes a plurality of divided small regions which are motion regions 204. In such a case, the sum of the areas of the plurality of motion regions 204 is compared with the one tracking region 203 to determine the ratio. That is, all the motion regions 204 included in the tracking region 203 are subjected to the calculation, and the ratio is calculated not individually but from the sum total. Specifically, the ratio is calculated as "the sum of the areas of the motion regions/the area of the tracking region."

In FIGS. 2A and 2B, the motion region(s) 204 included in the tracking region 203 has/have a sufficiently large area. The ratio (degree of presence) is thus higher than or equal to the predetermined reference value, and the tracking processing is determined to be continued. In FIG. 2C, the motion regions 204 included in the tracking region 203 are small (in area). The ratio (degree of presence) is lower than the predetermined reference value, the tracking processing is determined to be suspended or ended. In the present first exemplary embodiment, an example is described where the area ratio is calculated as the degree of presence of the motion region(s) 204 in the tracking region 203 (included in motion region information) relative to the tracking region 203.

The method for calculating the degree of presence is not limited to a particular one. Various calculation methods may be used. Various parameters indicating the ratio of the motion region(s) 204 may be used.

For example, if a degree of reliability (or likelihood) of the motion region(s) 204 is calculated for each pixel or small region extracted as the motion region(s) 204, a value calculated by assigning weights based on the degree of reliability may be used as a value corresponding to the degree of presence. Such a value may be determined by setting a higher weight as getting closer to the position of the center of gravity of the tracking region 203.

(Degree of Reliability)

Various algorithms and techniques for determining a motion region 204 have conventionally been known. Such algorithms often can simultaneously calculate a predetermined degree of reliability with respect to the determined motion region 204. The degree of reliability varies with the algorithm. Any of such degrees of reliability can be used for the foregoing calculation. A degree of reliability may be calculated with respect to a feature point in the determined motion region 204. In such a case, the sum of the degrees of reliability with respect to feature points within the motion region 204 or an average of the degrees of reliability may be used as the degree of reliability of the motion region 204.

The foregoing description has dealt with an example where the tracking region 203 has the same shape and the same area and remains unchanged. A tracking method for dynamically changing the shape and/or area of a tracking region 203 over time may be employed.

In other modes, (the total area of) motion regions 204 within a certain distance (which may include both the inside and the outside of a tracking region 203) from the center of gravity of the tracking object (or tracking region 203) may be used to calculate the area and the degree of presence (for example, area ratio) of the tracking region 203.

As described above, the degree of presence is typically the ratio of the area of the motion region(s) 204 relative to the area of the tracking region 203. Simply stated, the ratio is given by "the area of the motion region(s)/the area of the tracking region." Another calculation processing or function processing (for example, the foregoing degree of reliability) may be applied to the ratio to determine another value, based on which the determination unit 104b may make a determination.

The amounts of other motion parameters may be taken into consideration. For example, the foregoing another value may be calculated with an amount of the magnitude of motion taken into consideration. The foregoing another value may be calculated with other parameters depending on the intended use.

In such a manner, the determination unit 104b determines whether to continue the tracking processing based on various types of determined values.

Next, a procedure of processing performed by the information processing apparatus 100 according to the present first exemplary embodiment will be overviewed with reference to the flowchart of FIG. 3.

In step S301, the image acquisition unit 102 obtains an image input to the information processing apparatus 100. For example, the image may be a one-hour moving image.

In step S302, the tracking unit 101 performs tracking processing based on the image obtained in step S301. In step S303, the motion region extraction unit 103 performs motion region extraction processing based on the image obtained in step S301.

In step S304, the presence degree calculation unit 104a calculates the degree of presence, and the determination unit 104b performs tracking continuation determination processing based on the degree of presence. The tracking continuation determination processing in step S304 is performed for each tracking object. A tracking object or objects determined to continue to be tracked will continue to be subjected to the tracking processing if the processing proceeds to step S302 again. For a tracking object or objects of which the tracking processing is determined to be ended, the tracking processing will not be taken over even if the processing proceeds to step S302 again.

If a new object to be tracked is found by matching processing on a new image input in step S301, the tracking processing of the found tracking object is started. Various techniques for starting tracking processing have conventionally been known. Whether to start the tracking processing can be determined by using such various techniques.

In step S305, a control unit (which can be implemented by a CPU 11 illustrated in FIG. 9) of the information processing apparatus 100 determines whether to continue the processing. In other words, the control unit determines whether all the frames included in the image have been processed (for example, all the frames for one hour have been processed), i.e., whether to end the entire tracking processing on the image (for example, one-hour moving image processing).

In step S305, if, for example, there is no frame left to process (YES in step S305), the processing proceeds to step S306. If there is any frame to process (NO in step S305), the processing proceeds to step S301.

In step S306, subsequent processing using a result of the tracking processing can be performed. The subsequent processing may be any processing that uses determination processing about whether to continue the tracking processing. Examples include various kinds of video processing using a tracking result.

Processing load of such tracking processing continuation determination using the degree of presence of motion regions according to the present first exemplary embodiment is not so high, for example, compared to that of conventional matching processing-based tracking processing continuation determination using a color histogram. The tracking processing continuation determination according to the present exemplary embodiment may therefore be performed as a preprocess with the tracking processing as the subsequent main process. Such tracking processing may be accompanied by the conventional matching process-based tracking processing continuation determination.

As described above, according to the first exemplary embodiment, matching processing is performed to identify tracking objects. Meanwhile, the tracking continuation determination is made by using the degree of presence of motion regions with respect to the tracking information. This can improve the accuracy of the tracking continuation determination.

Next, a specific operation of step S304 according to the present first exemplary embodiment will be described in detail with reference to the flowchart of FIG. 4. Steps S301 to S303 of FIG. 4 are similar to those of FIG. 3.

Steps S401, S402, S403, and S404 of FIG. 4 correspond to step S304 of FIG. 3. In step S401, the presence degree calculation unit 104a calculates the degree of presence of the extracted motion region(s) (which may be referred to as moving region(s)) relative to the tracking region. As described above, the degree of presence is calculated as the ratio of the amount (area) of the motion region(s) included in the tracking region 203. Specifically, the area ratio is calculated by "(the sum of) the area of the motion region(s)/the area of the tracking region."

Figure 5:
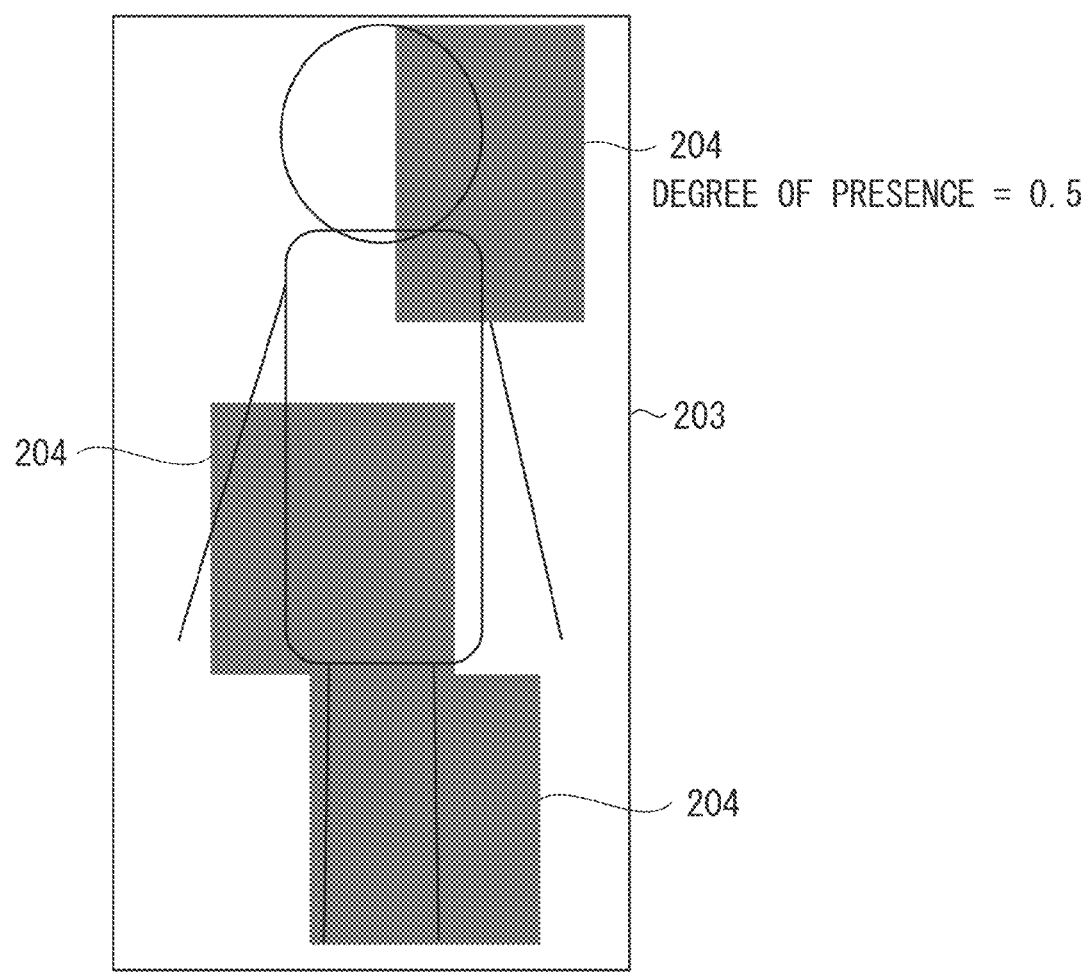
FIG. 5 is a diagram for describing the concept of a degree of presence and a specific numerical example thereof.

FIG. 5 is an explanatory diagram schematically illustrating the concept of the degree of presence. As illustrated in FIG. 5, a human model is surrounded by a rectangular region which is a tracking region 203. FIG. 5 illustrates a state where there are three motion regions 204 in the tracking region 203. The motion regions 204 are the hatched portions inside the tracking region 203. Based on such a state, the degree of presence is calculated to be 0.5 (see FIG. 5).

In step S402, the determination unit 104b compares the degree of presence with a predetermined threshold (reference value). If the degree of presence is higher than or equal to the predetermined threshold (YES in step S402), the determination unit 104b determines to continue the tracking processing and the processing proceeds to step S403. If the degree of presence is lower than the predetermined threshold (reference value), the processing proceeds to step S404.

The result of the determination about whether to continue the tracking processing is supplied to the tracking unit 101. Based on the determination, the tracking unit 101 continues or stops the tracking processing.

The tracking processing is performed for each tracking object 201. The tracking processing on a tracking object 201 may be continued while the tracking processing on another tracking object 201 is stopped. Such processing is performed for each tracking object 201.

In step S403, the tracking unit 101 outputs tracking information which is the tracking result. The tracking information is information including the tracking region 203. The output tracking information including the tracking region 203 is supplied to the determination unit 104b and the display control unit 112. The display control unit 112 collectively outputs the tracking information (such as tracking region 203) which is the tracking result, to the display unit 110. The display unit 110 includes the display device (such as a display screen) and displays the information. Here, the display control unit 112 outputs the information and the moving image obtained by the image acquisition unit 102 to the display unit 110 in a superimposed manner.

As illustrated in FIG. 1, the display control unit 112 is located in the information processing apparatus 100. However, the display control unit 112 may be arranged outside the information processing apparatus 100. For example, the display control unit 112 may be arranged in the display unit 110.

In FIG. 1, the image acquisition unit 102, the tracking unit 101, the motion region extraction unit 103, the presence degree calculation unit 104a, the determination unit 104b, and the display control unit 112 are arranged inside the information processing apparatus 100. Alternatively, for example, the information processing apparatus 100 may include only an imaging unit (for example, an imaging unit 15 of FIG. 9) and the image acquisition unit 102. In such a case, all or part of the tracking unit 101, the motion region extraction unit 103, the presence degree calculation unit 104a, the determination unit 104b, and the display control unit 112 may be arranged on the display device side.

In step S404, the determination unit 104b supplies the determination result that does not continue the tracking processing, to the tracking unit 101. Receiving the determination result, the tracking unit 101 stops the tracking processing on the tracking object.

After the end of the processing of step S403 or S404, in step S305, the control unit of the information processing apparatus 100 determines whether to end the entire tracking processing. This processing is similar to that of step S305 described above. The control unit here determines whether there is any frame to be processed. If all the frames have not been processed (NO in step S305), the tracking processing on the moving image is continued. If all the frames have been processed (YES in step S305), the processing proceeds to step S306. The processing of step S306 is similar to that of step S306 in FIG. 3.

The end determination in step S305 may be made by the control unit, the tracking unit 101, or the motion region extraction unit 103. The reason is that whether all the frames included in the moving image supplied from the image acquisition unit 102 have been processed is known to the tracking unit 101 and the motion region extraction unit 103.

A second exemplary embodiment of the present invention deals with a case where the determination unit 104b determines to continue tracking, i.e., does not determine to stop tracking if a tracking object is at rest and no motion region can be extracted.

Like the first exemplary embodiment, the presence degree calculation unit 104a calculates the degree of presence of a motion region or regions relative to a tracking region from the tracking region received from the tracking unit 101 and motion region information received from the motion region extraction unit 103. The determination unit 104b determines whether to continue tracking based on the degree of presence.

In particular, in the present second exemplary embodiment, the determination unit 104b compares the position of a current tracking region 203 obtained from the tracking unit 101 with that of a past tracking region 203 obtained in a past frame. If it is determined that the tracking object has hardly moved, from the magnitude of the amount of movement of the current tracking region 203, the determination unit 104b determines that the tracking object 201 is at rest. The amount of movement can be determined from a difference between the position of the past tracking region 203 obtained in the past frame and that of the current tracking region 203. Specifically, the determination unit 104b sets a certain reference value, and, if the amount of movement is smaller than the reference value, determines that the tracking object 201 is at rest. In fact, the determination unit 104b determines that the tracking object 201 is at rest not only when the tracking object 201 remains completely at rest but also when the tracking object 201 is substantially at rest.

FIG. 6 is an explanatory diagram illustrating a state of the determination. Even if a tracking region 603 is not moving as illustrated in FIG. 6, the tracking region 603 matches the tracking information about the tracking object by template matching processing. In such a state, the amount of motion regions in the tracking region 603 decreases. The tracking object is considered to be only temporarily out of action, and the tracking processing is to be continued. In the present second exemplary embodiment, the tracking processing is thus continued if the tracking object is at rest. In the present second exemplary embodiment, whether the tracking object is at rest is determined depending on whether the amount of movement of the tracking region 603 is smaller than a predetermined reference value as described above.

In the present second exemplary embodiment, if it is determined that the tracking object is at rest, the degree of presence calculated by the presence degree calculation unit 104a from (the motion region(s) included in) the motion region information from the motion region extraction unit 103 may fall below the reference value. Even in such a case, the determination unit 104b determines to continue tracking. Like the first exemplary embodiment, the degree of presence is the ratio of (the amount of) the motion region(s) 204 included in the tracking region 203. Various methods may be used to determine the degree of presence.

In the present exemplary embodiment, the tracking processing is thus continued if the degree of presence is lower than a certain reference value and it is determined that the tracking object is at rest.

Figure 7A:
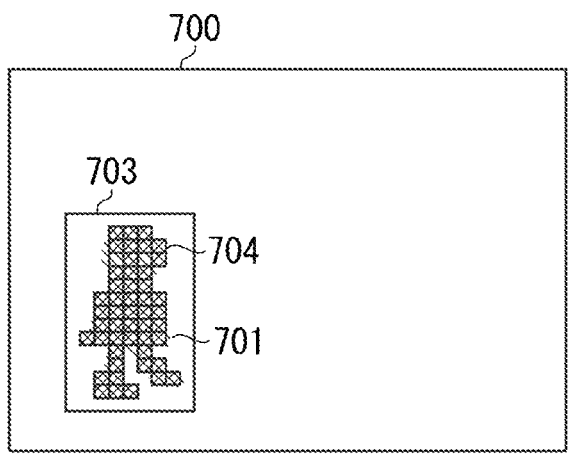
FIGS. 7A, 7B, and 7C are other explanatory diagrams for describing an operation for continuing tracking processing on a stationary object.

A method for determining whether to continue tracking according to the present second exemplary embodiment will be described in detail with reference to FIGS. 7A to 7C. Suppose that the processing proceeds in a time series manner from FIG. 7A to FIG. 7C. If the motion region extraction unit 103 performs processing that includes generation of a reference image and a tracking object 701 remains still for a long time, the information about the tracking object 701 is added to the reference image. This reference image is used when detecting whether there is a motion.

Figure 7B:
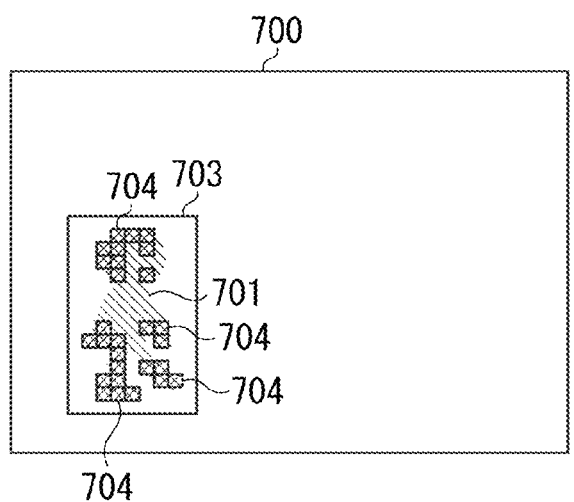
Figure 7C:
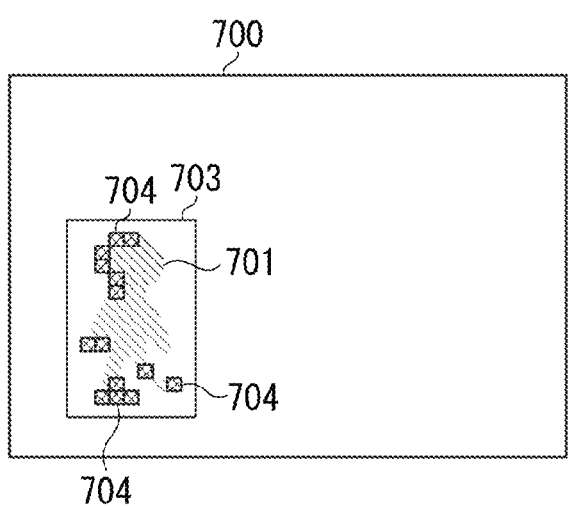

As the processing proceeds to FIGS. 7B and 7C, extracted motion regions 704 decrease. In the first exemplary embodiment, if the motion regions 704 decrease (the value of the degree of presence falls below a predetermined value), in principle, it is determined that the tracking of the tracking region 703 is suspended or ended. In contrast, according to the present second exemplary embodiment, if the tracking region 703 is found to have hardly moved (can be regarded as being at rest) in FIGS. 7A to 7C as a result of template matching processing, the determination unit 104b determines to continue tracking as described above. Such a determination is made by the determination processing according to the present second exemplary embodiment.

In the foregoing first exemplary embodiment, if the motion regions 704 decrease, the "degree of presence" falls below a certain reference value and the tracking processing is suspended or ended. This can avoid a drift when the tracking object 701 hides behind an obstacle. However, if the tracking object 701 is determined to be at rest, a drift is unlikely to occur. The tracking processing is thus considered to be able to be continued without a problem. The continuation of the tracking processing is rather considered to contribute to a quick start of tracking in cases where the tracking object 701 starts to move in the future. Then, in the present second exemplary embodiment, the tracking processing is continued if the tracking object 701 is determined to be at rest.

As discussed in Japanese Patent Application Laid-Open No. 2013-25490 mentioned above, an object can be detected by determining a difference between the frame image of interest and a background image captured in advance. Aside from such a method, an object may be detected by learning an image of the object to be detected to generate an identifier and performing detection using the identifier. In either case, if the result of the object detection and the tracking information are associated with each other, the tracking processing can be continued (see FIGS. 7A to 7C described above).

In a third exemplary embodiment of the present invention, a case is described where the display control unit 112 changes a method for displaying the tracking result based on the result of the determination unit 104b. In the foregoing first and second exemplary embodiments, the determination unit 104b determines whether to continue the tracking processing. If the determination unit 104b determines not to continue the tracking processing, the tracking processing itself is stopped (suspended or ended). In the first and second exemplary embodiments, the display control unit 112 simply superimposes the result of the tracking processing on an image and transmits the resultant, which is displayed by the display unit 110. Consequently, the user can only simply observe the result of the tracking processing on the display unit 110.

However, a contrivance to continue the tracking processing itself and hide the display can also be convenient to the user. Moreover, if the tracking processing is stopped, it may often be convenient to know what kind of stop it is.

In the present third exemplary embodiment, if the determination unit 104b determines not to continue the tracking processing, the display method is changed to call the user's attention. Such an operation will be described in detail below.

In the present third exemplary embodiment, if the determination unit 104b determines to suspend or end tracking a tracking object 201, the tracking unit 101 may continue to subject the tracking object 201 to tracking processing equivalent, in processing load, to tracking continuation determination processing, or tracking processing smaller, in processing load, than tracking continuation determination processing. Simple tracking processing refers to processing that entails a small amount of calculation or tracking processing where lower accuracy is acceptable.

The display unit 110 changes the method for displaying the tracking information based on the tracking information received from the tracking unit 101 and the result of tracking continuation determination received from the determination unit 104b. An example of a display control in the present third exemplary embodiment will be described below.

For example, if the result of the tracking continuation determination is to continue, the display control unit 112 highlights and transmits the tracking information to the display unit 110. For example, if the result of the tracking continuation determination is to suspend, the display control unit 112 display in a low-key manner and transmits the tracking information to the display unit 110. For example, if the result of the tracking continuation determination is to end, the display control unit 112 does not display the tracking information, i.e., does not include the tracking information in the signal (image signal) to be transmitted to the display unit 110. As a result, the display unit 110 displays the moving image of the image signal not including the tracking information. A highlight display and a low-key display will be described in detail below. FIG. 8 illustrates an example of a low-key display. In the example of FIG. 8, a low-key display 804 of a tracking region 803 is displayed by broken lines.

As described above, in the present third exemplary embodiment, the display control unit 112 employs various display methods according to the content of the tracking continuation determination output from the determination unit 104b. As a result, the user can recognize the state of the tracking on-screen on the display device of the display unit 110, whereby a highly-convenient information processing apparatus can be achieved. As employed herein, the tracking continuation determination is information about the result of determination of the determination unit 110b. The tracking continuation determination is supplied from the determination unit 110b to the display control unit 112 (see FIG. 1).

The tracking continuation determination may be supplied to the display control unit 112 in combination with the tracking information output from the tracking unit 101. To suspend and to end may have the same meanings as described in the foregoing first exemplary embodiment, and may have different meanings or refer to different states. While in the present third exemplary embodiment, two types of examples, i.e., to suspend and to end has been described, other types may be added.

<Modification of Third Exemplary Embodiment>

In the foregoing third exemplary embodiment, an example has been described where if the tracking processing is not continued and stopped, the display control unit 112 changes the display according to the type of the stop (suspension or end). However, the display control unit 112 may more conveniently continue tracking for several frames from stop determination of tracking and display the tracking region 803 and its path 809 as the low-key display 804. The number of several frames may be determined in advance.

FIG. 8 illustrates the low-key display 804 according to a modification of the present third exemplary embodiment. Depending on the frame rate of the moving image, the specific number of several frames can take various values including two to three frames to 10 to 10000 frames. Typically, two to three frames are often used. For the sake of visibility, the number of frames may be as many as for several seconds to a dozen seconds or so. The number of frames may be about 50 to 500 frames or about 100 to 1000 frames.

Such an operation is controlled by the display control unit 112 like the foregoing third exemplary embodiment. The actual number of several frames may be configured to be arbitrarily set by the user from outside.

FIG. 8 illustrates the broken-lined display as an example of the low-key display 804. Various methods may be employed for a low-key display. A normal display may be regarded and handled as a highlight display. In the example of FIG. 8, the tracking region 803 indicated by the normal solid lines is handled as a highlight display for the sake of convenience. Thick lines may be used.
(Highlight Display, Low-Key Display, and Control Method Thereof)

A highlight display and a low-key display will be described. A highlight display is a display easily recognizable to the user. For example, in a highlight display, tracking information is displayed in solid lines. A low-key display is a display less recognizable to the user. In a low-key display, tracking information is displayed in broken lines. It will be understood that such a display method is based on the ease of recognition by the user, and not limited to a particular method. A normal display in solid lines may be regarded as a highlight display. A display in broken lines or in gray may be handled as a low-key display.

A highlight display may be performed in noticeable color, such as red, or with low transparency. A low-key display may be performed in less noticeable color, such as black, or with high transparency. In the foregoing examples (the third exemplary embodiment and the modification of the third exemplary embodiment), the display is changed based on the result of the tracking continuation determination. The degrees of highlighting and low-keying of the display may be controlled according to the value of the degree of presence calculated by the presence degree calculation unit 104a. Processing for changing the degree of highlighting according to the value of the degree of presence and/or processing for changing the degree of low-keying according to the value of the degree of presence may be performed. Such processing operations can be performed by the display control unit 112. For example, the display control unit 112 may perform processing for changing brightness according to the value of the degree of presence or processing for adjusting the transparency of the display.

Up to this point, various exemplary embodiments of the present invention have been described in detail. An exemplary embodiment of the present invention may be implemented by processing for supplying a program for implementing one or more functions of the foregoing exemplary embodiments to a system or an apparatus via a network or a storage medium, and reading and executing the program by one or more processors of a computer of the system or the apparatus. An exemplary embodiment of the present invention may be implemented by using a circuit (for example, application specific integrated circuit (ASIC)) that implements one or more of the functions.

<Hardware Configuration Example>

Figure 9:
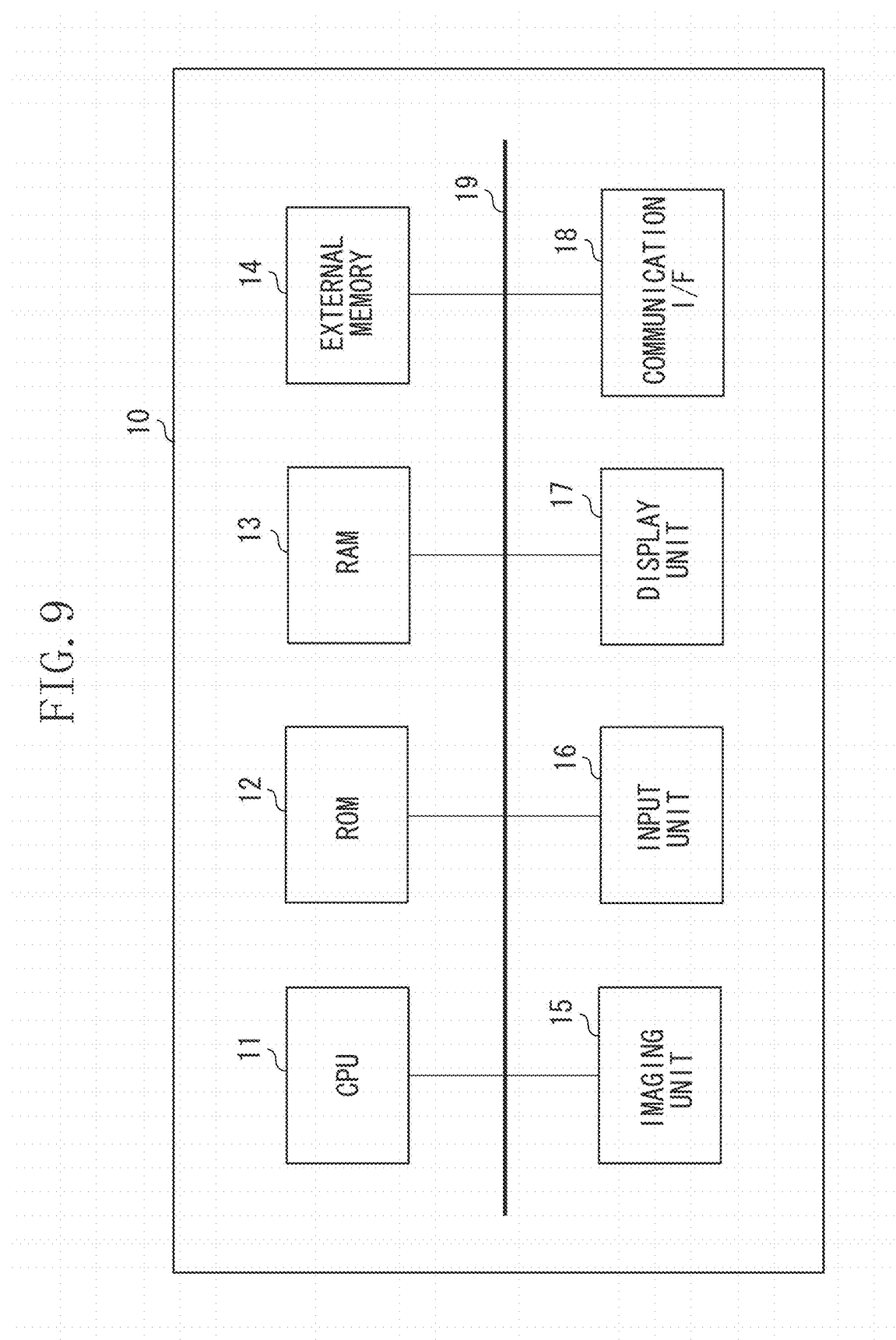
FIG. 9 is an explanatory diagram illustrating an example where the information processing apparatus according to the present exemplary embodiment is constituted by a computer.
Figure 10A:
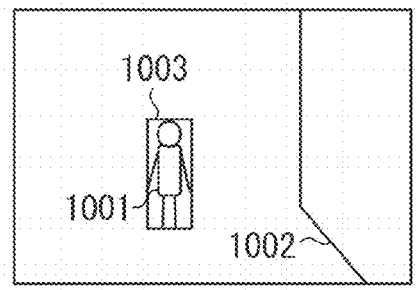
FIGS. 10A, 10B, 10C, and 10D are explanatory diagrams for describing an operation of tracking processing for tracking an object by using image features.
Figure 10B:
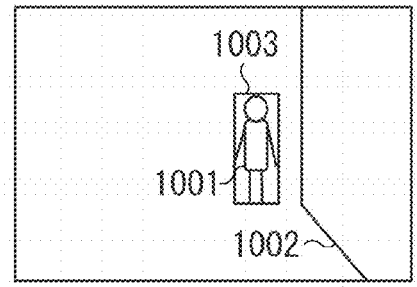
Figure 10C:
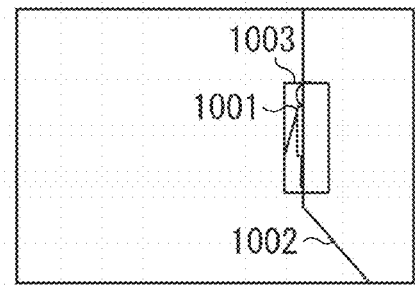
Figure 10D:
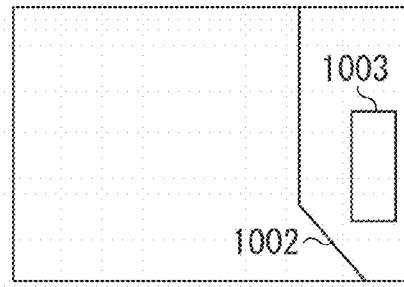
Figure 11A:
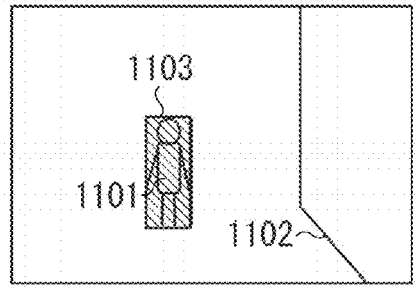
FIGS. 11A, 11B, 11C, and 11D are explanatory diagrams for describing an operation of a method for detecting an object by using a difference from a background image.
Figure 11B:
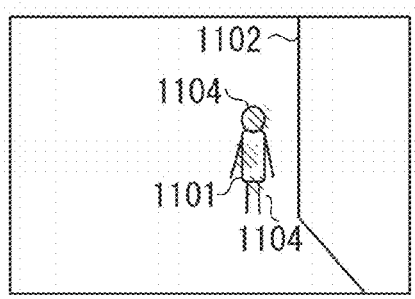
Figure 11C:
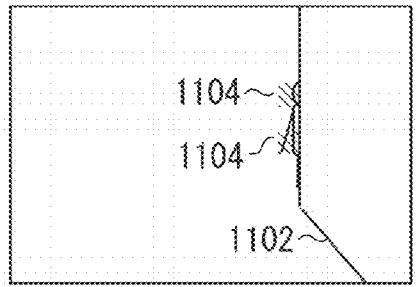
Figure 11D:
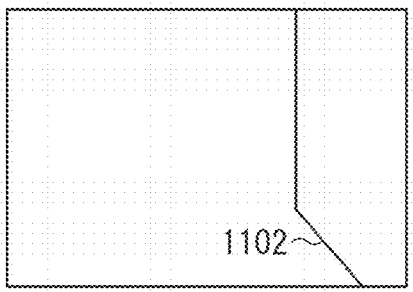

The information processing apparatus 100 in the video processing apparatus 120 of FIG. 1 may be configured by using hardware of an electronic apparatus that includes an imaging unit. FIG. 9 illustrates a configuration block diagram of such an electronic apparatus 10 (for example, a digital camera). As illustrated in FIG. 9, the electronic apparatus 10 includes a CPU 11, a read-only memory (ROM) 12, a random access memory (RAM) 13, and an external memory 14, which are connected to each other via a bus 19. The external memory 14 includes a hard disk and an optical drive. An imaging unit 15 serving as an image acquisition unit, an input unit 16, a display unit 17, and a communication interface (I/F) 18 are also connected to the bus 19.

The display unit 17 is a display configured to include a display interface. The display unit 17, serving as a screen of the electronic apparatus 10, may function as the display unit 110 of FIG. 1 to display the tracking region 203. The display unit 110 may be constituted by a single computer. Such a display unit 110 can be connected to the communication I/F 18 by using a local area network (LAN) cable and via a hub. In this case, any communication method may be applied to the communication I/F 18. For example, the communication I/F 18 may be a LAN interface. The computer serving as the display unit 110 can thus display tracking information transmitted from an external apparatus on its own display device.

The computer implementing the display unit 110 of FIG. 1 may also include the hardware configuration of FIG. 9 except the imaging unit 15.

If the configuration of FIG. 9 is employed, the tracking unit 101 can be constituted by the CPU 11 and a program executed by the CPU 11. The program is stored in the ROM 12, the RAM 13, or the external memory 14. A digital versatile disc (DVD) serving as a storage medium storing the program may be loaded into the optical drive to install the program in the computer 10.

The motion region extraction unit 103, the presence degree calculation unit 104a, and the determination unit 104b can also be constituted by the CPU 11 and the program executed by the CPU 11 like the tracking unit 101.

In the foregoing, an example has been described where the program is stored inside the computer 10. However, the program may be configured to be run on an external server (not-illustrated) via the communication I/F 18. The computer 10 may not only obtain images via the imaging unit 15 serving as a camera, but also be supplied with images from the outside such as the Internet via the communication I/F 18.

The exemplary embodiments of the present invention have been described in detail above. The foregoing exemplary embodiments have provided only specific examples of implementation of the present invention. The technical scope of the present invention is not limited by the foregoing exemplary embodiments. Various modifications may be made without departing from the gist of the present invention, and all such modifications are also included in the technical scope of the present invention.

According to the exemplary embodiments having the foregoing configurations, a moving region ratio which is the ratio of an identified motion region or regions with respect to a tracking region in which a tracking object is included is determined. Whether to continue tracking is determined based on the determined moving region ratio. This can reduce a delay or an error of determination to suspend or end tracking processing. The accuracy of determination to continue the tracking processing can thus be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-215788, filed Oct. 22, 2014, which is hereby incorporated by reference herein in its entirety.

What is claimed is:

1. An information processing apparatus comprising:
a tracking unit configured to identify a tracking region including a tracking object in an image;
an identification unit configured to identify a motion region inside the tracking region in the image;
a derivation unit configured to derive a ratio of the motion region relative to the tracking region; and
a determination unit configured to determine whether to continue tracking the tracking object based on the derived ratio.

2. The information processing apparatus according to claim 1, wherein the determination unit is configured to stop tracking the tracking object if the ratio is lower than a predetermined reference value.

3. The information processing apparatus according to claim 2, further comprising a display control unit configured to, if the determination unit determines to stop tracking the tracking object, cause a display device to display tracking information about the tracking object for several frames in a low-key manner.

4. The information processing apparatus according to claim 1, wherein the derivation unit is configured to derive a ratio between the tracking region and an area by weighting an area of the motion region according to a degree of reliability of the motion region, as the ratio of the motion region relative to the tracking region.

5. The information processing apparatus according to claim 1, wherein the derivation unit is configured to derive a ratio between the tracking region and an area obtained by weighting an area of the motion region according to a distance of the motion region from a center of gravity of the tracking region, as the ratio of the motion region.

6. The information processing apparatus according to claim 1, wherein the derivation unit is configured to derive a ratio between the tracking region and an area of the motion region within a predetermined distance from a center of gravity of the tracking region, as the ratio of the motion region.

7. The information processing apparatus according to claim 1, wherein the determination unit is configured to determine whether the tracking object is at rest, and, if the tracking object is determined to be at rest, determine to continue tracking the tracking object regardless of a value of the ratio of the motion region.

8. The information processing apparatus according to claim 7, wherein the determination unit is configured to determine an amount of movement of the tracking object based on the tracking region from a difference between a position of a current tracking region and a position of a past tracking region, and, if the amount of movement is smaller than a predetermined reference value, determine that the tracking object is at rest.

9. The information processing apparatus according to claim 1, further comprising a display control unit configured to, if the determination unit determines to continue tracking the tracking object, cause a display device to highlight tracking information about the tracking object.

10. The information processing apparatus according to claim 9, wherein the display control unit is configured to change a degree of highlighting of the highlighted tracking information, according to a value of the ratio of the motion region.

11. The information processing apparatus according to claim 1, further comprising a display control unit configured to, if the determination unit determines not to continue and to suspend tracking the tracking object, cause a display device to display tracking information about the tracking object in a low-key manner.

12. The information processing apparatus according to claim 11, wherein the display control unit is configured to change a degree of low-keying of the tracking information displayed in a low-key manner, according to a value of the ratio of the motion region.

13. The information processing apparatus according to claim 1, further comprising a display control unit configured to, if the determination unit determines not to continue and to end tracking the tracking object, cause a display device to display an image signal not including tracking information about the tracking object.

14. An information processing method comprising:
identifying a motion region included in a tracking region including a tracking object in an image;
deriving a ratio of the identified motion region relative to the tracking region; and
determining whether to continue tracking the tracking object based on the derived ratio.

15. The information processing method according to claim 14, wherein the determining includes determining whether the tracking object is at rest, and, if the tracking object is determined to be at rest, determining to continue tracking the tracking object regardless of the ratio of the motion region.

16. The information processing method according to claim 14, further comprising, if the determining determines to continue tracking the tracking object, causing a display to device highlight tracking information about the tracking object.

17. The information processing method according to claim 14, further comprising, if the determining determines not to continue and to suspend tracking the tracking object, causing a display device to display tracking information about the tracking object in a low-key manner.

18. The information processing method according to claim 14, further comprising, if the determining determines to stop tracking the tracking object, causing a display device to display tracking information about the tracking object for several frames in a low-key manner.

19. A non-transitory computer-readable recording medium storing a program for causing a computer to perform operations comprising:
identifying a motion region included in a tracking region including a tracking object in an image;
deriving a ratio of the identified motion region relative to the tracking region; and
determining whether to continue tracking the tracking object based on the derived ratio.

* * * * *